Oct. 9, 1934.  G. GRANDJEAN  1,975,786
JOURNAL BEARING
Filed July 3, 1930  4 Sheets-Sheet 1

Inventor
Georges Grandjean,
By D. P. Wolhaupter
Attorney

Oct. 9, 1934.     G. GRANDJEAN     1,975,786
JOURNAL BEARING
Filed July 3, 1930     4 Sheets-Sheet 2
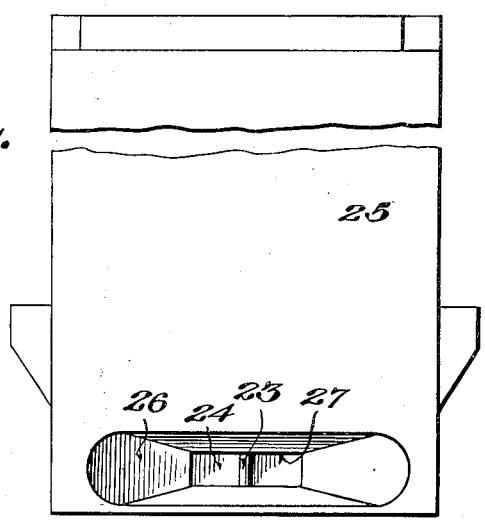
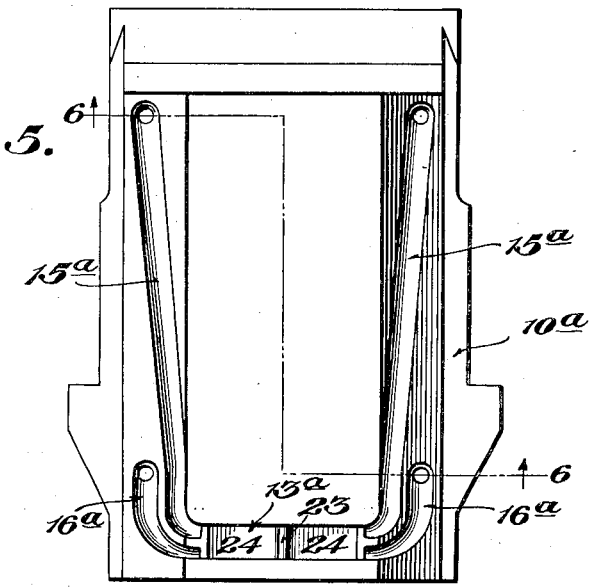
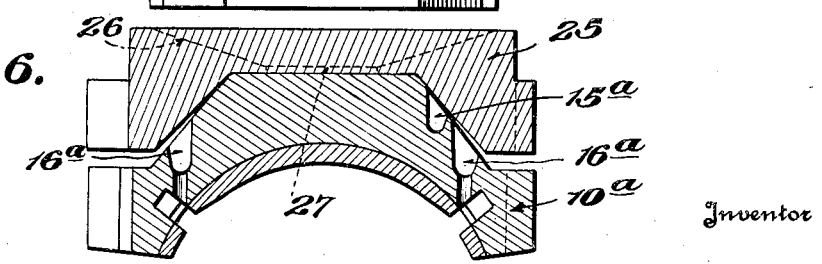

Oct. 9, 1934.  G. GRANDJEAN  1,975,786
JOURNAL BEARING
Filed July 3, 1930   4 Sheets-Sheet 3
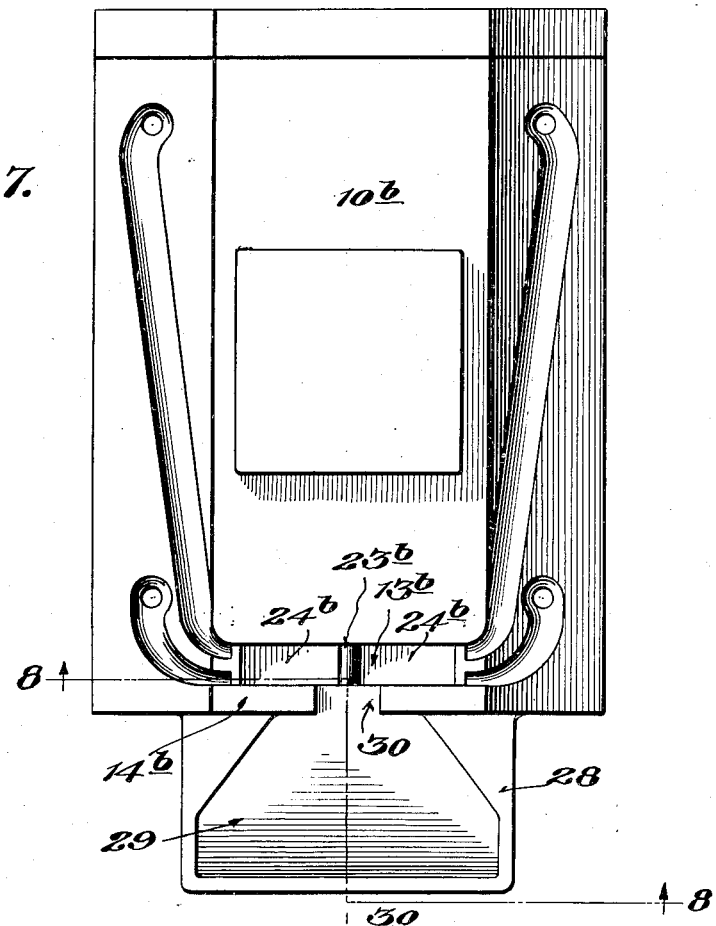
Fig. 7.
Fig. 8.
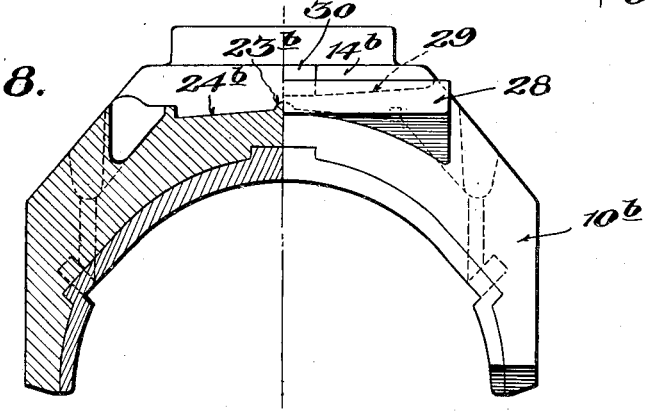
Inventor
Georges Grandjean,
By A. P. Wolbaugher
Attorney

UNITED STATES PATENT OFFICE 1,975,786

JOURNAL BEARING

Georges Grandjean, New York, N. Y., assignor to Isothermos Corporation of America, New York, N. Y., a corporation of Delaware Application July 3, 1930, Serial No. 465,701
In Switzerland July 4, 1929

3 Claims. (Cl. 308—79)

This invention relates to certain automatically lubricated journal bearings, such as exemplified in Reissue Patent No. 17,283, granted April 23, 1929, in which the oil, contained in a reservoir at the bottom of the journal box, is picked up by a rotary blade, from which it either drips directly to the top of the bearing, or is thrown by centrifugal force against the walls of the box down which it runs onto the top of the bearing, whence it is distributed by openings through the bearing to the contact surface thereof or to the journal.

It has been customary heretofore to provide the upper surfaces of bearings which were associated with automatic lubricating means of the general type referred to, with distributing openings or channels which delivered the oil to the under face of the bearing. While the channels in the top surface of these bearings were disposed to convey the oil to the various points in the inner face of the bearing, no provision was made for equal distribution of the oil to the channels, with the result that some of the channels received an excess of oil, while others received an insufficiency.

The present invention has for its object to provide means to assure a supply of substantially equal amounts of oil to the respective oil distributing channels, thereby to assure substantially uniform lubrication of the bearing and its associated journal.

The invention is illustrated in the accompanying drawings, in which:—

Figure 4 is a plan view of a wedge adapted for use with a bearing of the present type.

Figure 5 is a plan view of a slightly alternative embodiment of the bearing.

Figure 6 is a section taken approximately on the line 6—6 of Fig. 5 showing the wedge of Fig. 4 operatively disposed with respect to the bearing.

Figure 7 is a plan view of another slightly alternative embodiment of the bearing.

Figure 8 is a transverse section taken approximately on the line 8—8 of Fig. 7, the right hand half showing the front elevation.

Figure 1:
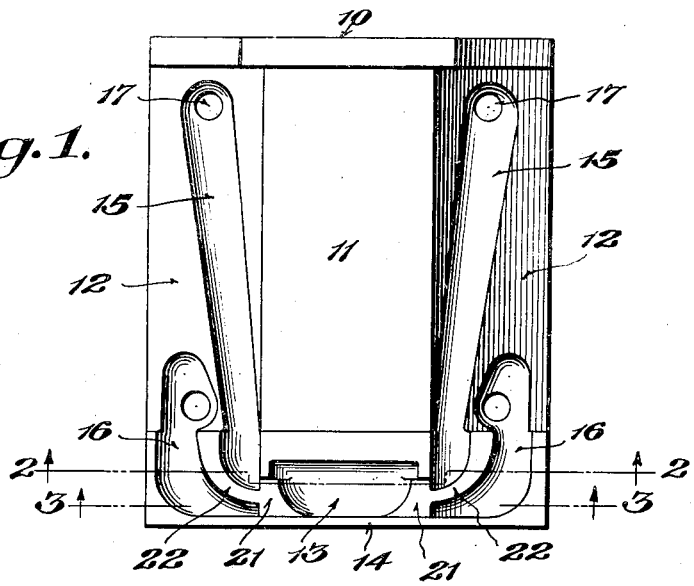
Figure 1 is a plan view of a typical bearing embodying the invention.
Figure 2:
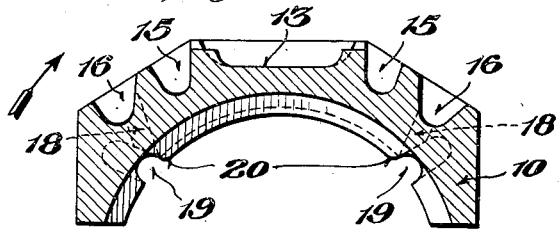
Figure 2 is a transverse section on line 2—2 of Fig. 1.
Figure 3:
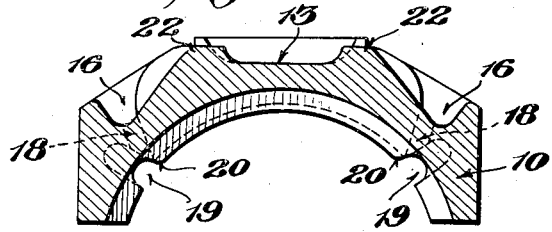
Figure 3 is a transverse section on line 3—3 of Fig. 1.

Referring to Figs. 1, 2 and 3 of the drawings, 10 indicates the bearing, which may be of any of the usual or standard types adapted to be seated in the upper part of the axle box, so that its lower arcuate face will be engaged by the journal section of the axle. As is usual in bearings of this type, the upper surface thereof comprises a substantially plain horizontal medial portion 11 and downwardly and outwardly inclined portions 12, 12 disposed one to either side of said medial portion, which latter engage and properly center the bearing in its seat in the journal box. Formed in the forward or front part of the medial portion 11 of the top surface of the bearing is a well or sump 13, which is bounded or defined by enclosing walls, one of which is constituted by the front flange 14 of the bearing.

Each of the inclined portions 12 of the bearing is provided with a pair of ducts or channels 15 and 16, respectively, each channel 15 extending longitudinally of the bearing and terminating near the rear end of the latter in an orifice 17, which opens into the lower face of the bearing, and each of the channels 16 being shorter than the channels 15 and terminating in an orifice 18, which opens into the inner face of the bearing near the front end thereof. Preferably, each pair of orifices 17 and 18 communicates with one of a pair of longitudinal channels 19, 19 formed in the inner face of the bearing beneath the inclined portions 12, 12 thereof, respectively, said channels 19, 19 being inclusive of dripping edges or lips 20, 20, respectively, which permit the oil to drip therefrom onto the surface of the journal, so that the latter is lubricated uniformly throughout the extent of its engagement with the bearing.

In order to insure a substantially uniform supply of oil to the respective pairs of channels 15 and 16, said channels, are connected to the well or sump 13 by outlets 21, 21 which are formed by depressions in the lateral walls of the well, the bottoms of the depressions being at a common level. In order to obtain a substantially uniform supply of oil to each of the channels 15 and 16 of the respective pairs, the inlet portions of these channels which communicate with the sump 13, are separated by a tongue or wall 22.

Inasmuch as the well or sump 13 in the top of the bearnig lies immediately below the upper portion of the path of travel of the rotary distributor blade, and also lies adjacent to the base of the wall over which the oil flows when projected outwardly from the distributor by centrifugal force, it is apparent that the well will receive the larger portion of the lubricant and, under ordinary conditions, will be maintained substantially full of oil, which will flow in a practically constant supply through the weir-like openings 21, 21 in the lateral walls of the well into the channels 15 and 16, along which channels the oil is conducted and ultimately discharged through the orifices 17 and 18 into the channels 19, 19 in the inner face of the bearing. Whenever the well 13 is substantially full of oil, the latter flows simultaneously into all of the passages 15 and 16, so that the supply of oil to the various points of the inner face of the bearing is substantially uniform.

When the distributor blade is rotated at a relatively high rate of speed, the oil picked up thereby is thrown by the blade, under centrifugal action, against the inner wall of the journal box and, as illustrated in the patent aforesaid, flows down suitable ridges or channels in said wall onto the upper surface of the bearing. According to the present invention, the well or sump 13 is located immediately below the portion of the inner wall of the journal box down which the oil flows and, therefore, receives the oil which is projected against the said wall. Thus it will be seen that, under all normal conditions, practically all of the oil which is distributed by the rotary blade finds its way initially into the well or sump 13, whence it is uniformly discharged by the several channels and orifices to the inner face of the bearing and to the surface of the journal engaging said bearing.

Referring now to the alternative embodiment of the invention illustrated in Fig. 5, it will be observed that the structural arrangement of the bearing 10$^a$ is practically the same as illustrated in Figs. 1 to 3 with the exception that the well or sump 13$^a$ is divided by a central rib or partition 23 into two sections 24, 24 which are individual, respectively, to the two pairs of channels 15$^a$, 16$^a$. Thus, any tendency of the oil to surge towards either end of the well or sump with a consequent excessive supply of oil to one pair of the channels and an insufficient supply of oil to the other pair of channels is effectively counteracted by said rib or partition.

Under certain circumstances, it may be found desirable to provide the journal box with a so-called "wedge" to receive the bearing. Such an arrangement is illustrated in Figs. 4 and 6 of the drawings, in which figures the wedge, designated as 25, is provided with an inverted trough-like recess in its under face to receive the upper face of the bearing. Near its forward end, in the top thereof, the wedge is provided with a well-like depression 26 having a discharge opening 27 in the bottom thereof which is disposed immediately above the well formed in the top surface of the bearing, so that the oil raised by the distributor blade, and either dripping from the latter or flowing down the walls of the journal box, will enter the well 26 and be delivered through the opening 27 into the well in the top of the bearing.

Referring now to the alternative embodiment of the invention illustrated in Figs. 7 and 8, it will be observed that the bearing 10$^b$ which is of practically the same construction as the bearing shown in Fig. 5, is provided at its forward end with a shelf-like extension 28, the upper face of which is dished to provide a well 29. The bottom of this well preferably is sloped towards the center thereof and is disposed, preferably, at a higher elevation than the bottom of the sump 13$^b$. In the flange 14$^b$ is formed a depression 30 to permit oil to flow from the well 29 into said sump, said depression being of a length to extend to either side of the partition 23$^b$ which divides the sump into the two sections 24$^b$, 24$^b$, whereby each section is assured of a substantially equal supply of oil from the well, the latter being adapted to be supplied with oil in the same manner as heretofore described in connection with the preceding figures of the drawings.

Figure 9:
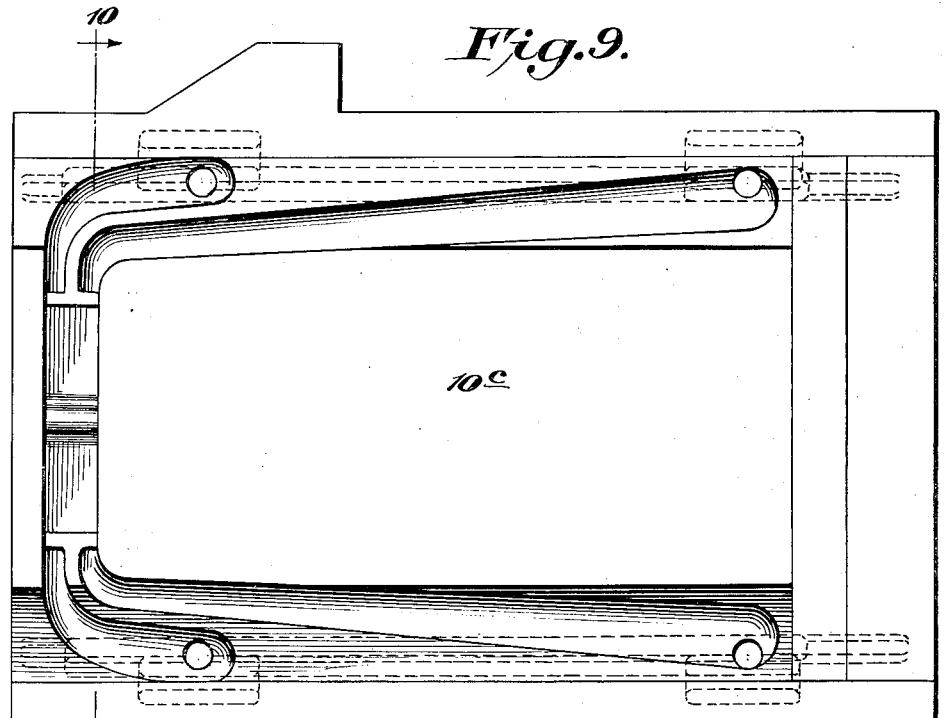
Figure 9 is a plan view of a bearing illustrating another alternative embodiment of the invention.
Figure 10:
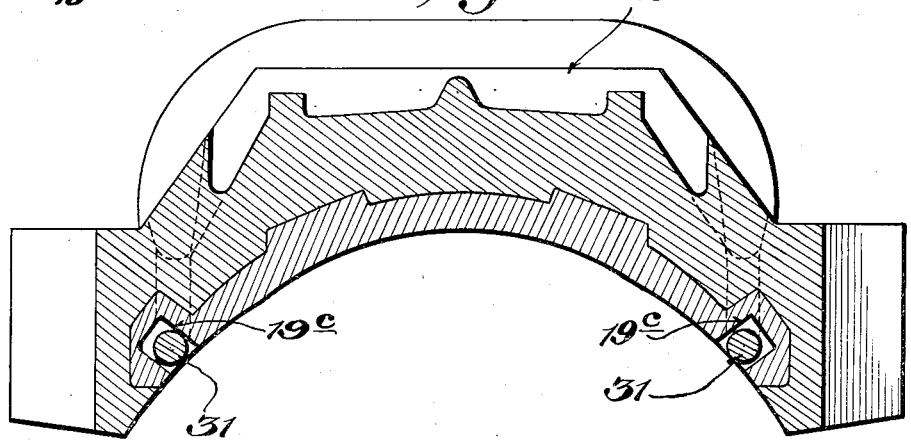
Figure 10 is a transverse section taken approximately on the line 10—10 of Fig. 9.

Referring now to Figs. 9 and 10 of the drawings, it will be observed that the bearing 10$^c$, which is of the same general construction as the bearing 10$^a$, has a roller 31 disposed in each of the channels 19$^c$ thereof. These rollers are of slightly less diameter than the width of said channels so as to be freely rotatable therein, and they are of substantially the same length as said channels or formed in sections occupying substantially the full length of said channels, the surfaces thereof being either smooth or grooved, as may be desired. Their function is to effect a substantially uniform distribution of oil along the length of the journal, which function they accomplish by rolling against the journal as the latter rotates, the oil, by capillary attraction and by reason of the rotation of the rollers, being evenly distributed along the latter and thus being evenly distributed to the journal and to the bearing.

I claim:—

1. A bearing for automatic lubricating journal boxes having a well in its top surface, said bearing having a plurality of channels connected to said well and extending to various points in said surface and further having discharge orifices communicating with said channels and opening into the inner face of the bearing, and a wedge engaging the upper face of the bearing provided with a well in its upper face disposed above the well in the bearing and having a bottom opening registering with the latter well.

2. A bearing for automatic lubricating journal boxes having an oil distributing channel to either side of the longitudinal center of the bearing and in the upper face thereof leading to the under side of the bearing, means providing an oil sump with which said channels are in oil receiving communication at a substantially common level, and means dividing said oil sump into a pair of sections individual, respectively, to each channel at the opposite sides of the bearing.

3. A bearing for automatic lubricating journal boxes having an oil distributing channel to either side of the longitudinal center of the bearing and leading to the under side of the bearing, means providing an oil sump with which said channels are in oil receiving communication at a substantially common level, means dividing said oil sump into a pair of sections individual, respectively, to the channels at opposite sides of the bearing, and means providing an oil well in discharging relation to both sections of said sump at a substantially common level.

GEORGES GRANDJEAN.